R. P. WALKER.
MACHINE FOR HULLING AND SCOURING COFFEE.
No. 10,328. Patented Dec. 20, 1853.
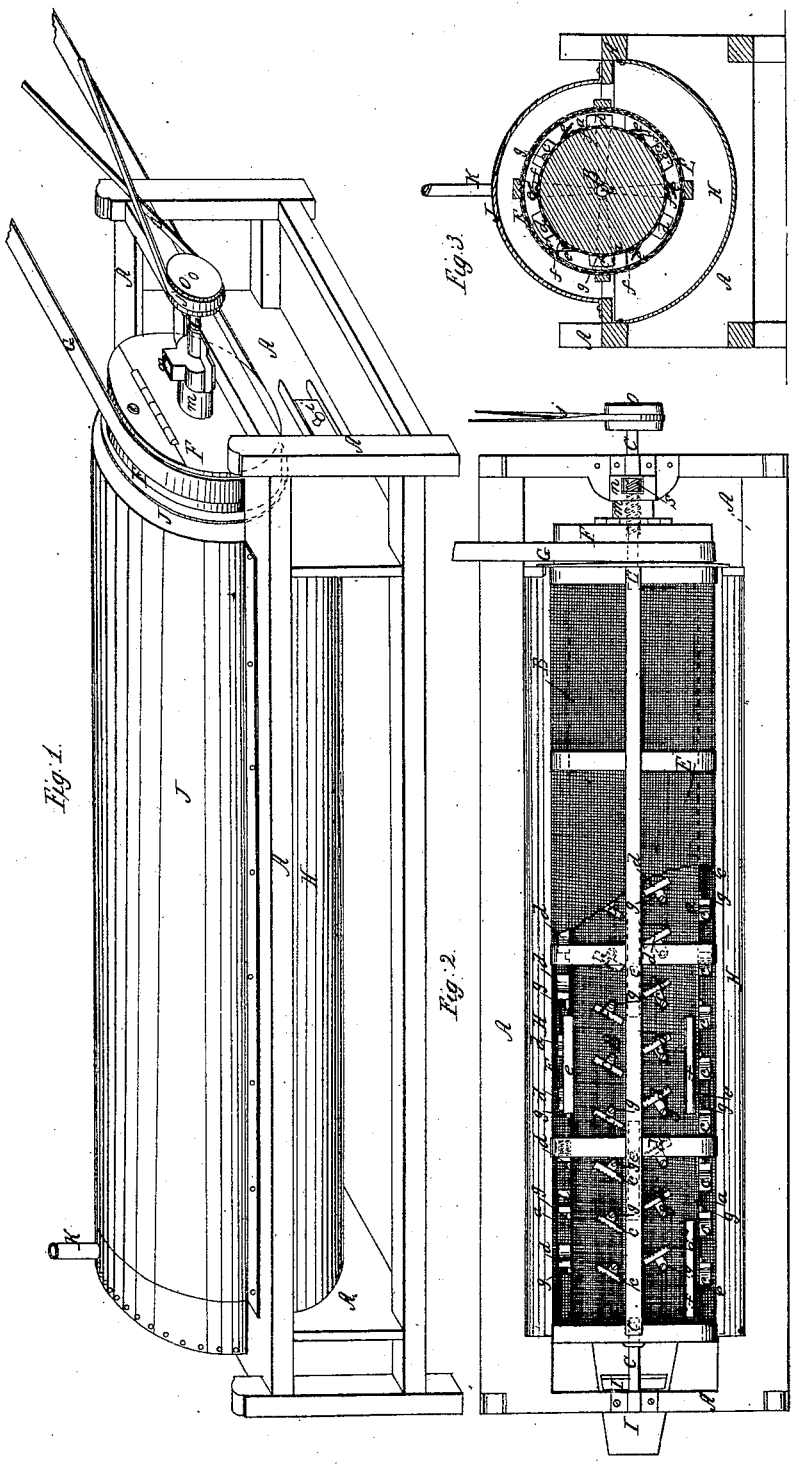

UNITED STATES PATENT OFFICE.

ROBERT P. WALKER, OF NEW YORK, N. Y.

MACHINE FOR HULLING AND SCOURING COFFEE.

Specification of Letters Patent No. 10,328, dated December 20, 1853.

*To all whom it may concern:*

Be it known that I, ROBERT P. WALKER, a the city, county, and State of New York, have invented a new and useful Machine for Hulling and Scouring Coffee; and I do hereby declare that the following is a full, clear, and exact description of the same, reference being had to the accompanying drawings, forming part of this specification, in which—

Figure 1, is a perspective view of the machine. Fig. 2, is a top view of the same. The top of the air tight case being removed. Fig. 3, is a vertical transverse section of the same, through the line $x$, $x$, in Fig. 2, the top being replaced.

Similar letters of reference in each of the several figures indicate corresponding parts.

This invention relates to certain new, useful, and important improvements in the machine for hulling and scouring coffee, whereby the shell in which the coffee is incased can be removed perfectly and with facility and also the inner gummy coatings taken off and the kernel scoured clean and bright and separated from dust and other foreign matter, and discharged into a proper receiver ready for use without being injured or bruised and broken.

It consists, 1st, in the employment of a revolving trunk or cylinder covered with wire net, when provided with a series of rasping or toothed beaters or other devices, which will present a rough surface to the coffee and remove perfectly the hull from the same, arranged or set at more or less of an angle along or around its periphery, and it having also, a series of springing gum elastic scourers and polishers set in a peculiar manner around its periphery and between the said beaters, and operating in combination with them to keep the coffee in rapid action and give it a direction toward the discharged end of the machine and serving after the shell has been broken off by the beaters to separate perfectly the inner glutinous or gummy coatings from the kernel; and this is done more perfectly and with greater ease on account of these coatings having an affinity for the elastic substance, and consequently they can be removed without subjecting the coffee to the ordinary hard scouring process which injures it materially and causes the grains to be broken and bruised. The said trunk or cylinder turning in a revolving wire net cylinder or concave which is incased in an air tight box, and turning in an opposite direction to the trunk.

To enable others skilled in the art to make and use my invention I will now proceed to describe it more minutely.

A, represents the frame of the machine which may be constructed as represented or otherwise.

B, is a trunk or cylinder, covered with wire net $a$, and having a shaft $c$ upon which it is secured and with which it revolves. This trunk has its periphery set with hullers $d$, $d$, $d$, $c$, $c$, $c$, which are set at more or less of an angle so as to regulate the discharge of the grain; and also to operate upon the same more effectually those $d$, $d$, $d$, being set just the reverse of those $c$, $c$, $c$, and consequently the too rapid discharge of the grain will be retarded slightly by those $d$, $d$, $d$, and thereby the hullers will have a greater length of time to operate upon the coffee and remove the hull from the same. The net $a$ around the trunk is designed to cause friction and prevent the trunk being worn away—the wire serving to aid in stripping the coffee of its impurities. The trunk B, also has a series of elastic beaters, rubbers or scourers $e$, $e$, $e$, arranged around its periphery in the manner shown in the drawing—these scourers being set in such a manner between the beaters $c$, $d$, and around the periphery of the trunk in the line of a screw, that they serve to rub the coffee and extract the gumming coatings from it and also to polish it and hasten its discharge. These scourers $e$, being of elastic substance are better suited for the purpose than anything heretofore used as they cause sufficient friction against the coffee and strip it of its inner coatings and yet do not break or bruise it, and as they are set inclining on spring seats $f$, $f$, there is no danger of the machine choking or the coffee being injured, for if there should be too great feed these seats will yield and allow the grain to pass. These scourers $e$, $e$, $e$, and the toothed beaters $c$, $d$, are set outside the periphery of the netting, covering the trunk—the beaters being made so as to be set in any position desired they turning on the set screws $g$, $g$, $g$, $g$, $g$, $g$, which retain them permanently fixed while the machine is operating. By having the beaters or hullers adjustable their rough surface can be set in such a position, while the coffee is only being scoured, as not to affect it materially—for the teeth for hulling can be set so that the coffee will not strike their cutting or sharp edge but just the reverse.

E, is an outer net cylinder or concave for the huller and polisher to revolve freely in and for the coffee to be thrown against and stripped of foreign matter; the wire net serving to cause friction as the coffee comes hard against it. This concave is hung on the shaft C, which supports the trunk B, and turns loosely or freely on the same in a different direction to that in which the trunk revolves. This net cylinder has a closed hollow head F, which is of such form that it serves to carry the driving band G; this head also has a neck or mouth $m$ for the grain to be fed through to the body; in which neck $m$, a feed screw $s$, is placed, which facilitates the feed to the machine as it comes from the hopper $n$ placed directly over the mouth $m$. The feed screw $s$, is cut on or placed over the shaft C and is set in motion as the trunk is turned, through the small driving pulley $o$, carrying a crossed band $j$, Fig. 1. This construction of head and feeding apparatus renders the operation of the machine perfect and enables me to obtain a perfectly air tight case.

H, is a trough or receptacle for the refuse matter—it is shaped like a semicircular concave and is made so as to allow the net cylinder to revolve freely in it—it is perfectly air tight and has a drawer $i$ through which the refuse can be removed.

I, is the discharge spout which communicates with the open end of the net concave, from which the coffee flows or passes into it and is discharged with the chaff, and both are carried along together by elevators until they come in contact with a blower when they are separated, the chaff being blown away and the coffee deposited into proper receivers.

J, is the closed or air tight top concave in which the large net cylinder revolves freely and in which the dust circulates as it escapes through the meshes of the wire cylinder from the coffee. It is secured fast on top the frame by means of screws or bolts, and can be removed when desired.

K, is the pipe through which the dust and other small extraneous matter are exhausted from the machine, and the coffee consequently kept free from the same as it is discharged. This pipe has a wire gauze $w$, secured on the end which communicates with the case J, for the purpose of preventing the coffee finding an exit with the dust. The pipe is carried up to any convenient position and made to communicate with a suction blower which sucks the dust from the machine.

This arrangement is certainly better adapted for the purpose intended than anything heretofore known; it is also much simpler and is more easily managed, and its cost will not be equal to that of the old machines.

What I claim as my invention, and desire to secure by Letters Patent, is:—

The combination of the springing rubber flaps, or scourers and polishers, $e, e, e$, with the angularly set hullers or beaters, $c, d$, the whole being constructed and arranged in any equivalent manner to that herein described and operating as set forth.

R. P. WALKER.

Witnesses:
 R. W. FENWICK,
 C. D. MUNN.